(12) United States Patent
De Angeli et al.

(10) Patent No.: US 7,305,012 B1
(45) Date of Patent: Dec. 4, 2007

(54) METHOD AND SYSTEM TO SYNCHRONIZE MOBILE UNITS TO A BASE TRANSCEIVER STATION

(75) Inventors: Alfonso De Angeli, Cornaredo (IT); Rossella De Benedittis, Barbaiana di Lainate (IT); Luca Marnoni, Saronno (IT)

(73) Assignee: Siemens Information and Communication Networks S.p.A., Milan (IT)

( * ) Notice: Subject to any disclaimer, the term of this patent is extended or adjusted under 35 U.S.C. 154(b) by 1054 days.

(21) Appl. No.: 10/069,545

(22) PCT Filed: Jul. 24, 2000

(86) PCT No.: PCT/EP00/07120

§ 371 (c)(1),
(2), (4) Date: Feb. 27, 2002

(87) PCT Pub. No.: WO01/17137

PCT Pub. Date: Mar. 8, 2001

(51) Int. Cl.
*H04J 3/06* (2006.01)

(52) U.S. Cl. ...................... 370/509; 307/503
(58) Field of Classification Search .................... None
See application file for complete search history.

(56) References Cited

U.S. PATENT DOCUMENTS

| | | | | |
|---|---|---|---|---|
| 5,404,355 | A * | 4/1995 | Raith | 370/311 |
| 5,606,560 | A * | 2/1997 | Malek et al. | 370/347 |
| 5,930,366 | A | 7/1999 | Jamal et al. | |
| 5,960,326 | A * | 9/1999 | Kido | 340/7.1 |
| 6,594,252 | B1 * | 7/2003 | Barany et al. | 370/347 |
| 6,731,622 | B1 * | 5/2004 | Frank et al. | 370/342 |

FOREIGN PATENT DOCUMENTS

GB  2 098 834 A  11/1982

OTHER PUBLICATIONS

Dahlman et al., IEEE Communications Magazine, vol. 36, No. 9, pp. 70-80 (1998).
European Telecommunications Standard UMTS 30.06, Version 3.0.0, XP002131074, pp. 1-3, 5-7, 27, 37, 39, 47 and 48 (1997).
Ping et al., ICCT Conference on Communication Technology, vol. 1, pp. 484-489 (1998).

* cited by examiner

*Primary Examiner*—Chi Pham
*Assistant Examiner*—Phuc Tran
(74) *Attorney, Agent, or Firm*—Birch, Stewart, Kolasch & Birch, LLP

(57) ABSTRACT

Method to synchronize at least one mobile unit to at least one base transceiver station belonging to a digital telecommunication network, in which radio signals transmitted and received by said base station are subdivided in frames (Fn) having pre-determined duration and each frame is subdivided in a pre-determined number of timeslots (Tn) and codes (Cn), said signals including at least a synchronization signal (S), which is transmitted by the base transceiver station and includes a sequence of modulation elementary units suitable to identify the timeslot (T1) and the code (C1) of a service channel containing system messages (M), said method including the following operational steps:
  marking the synchronization signal (S) in at least one frame (Fx) by the base transceiver station;
  transmitting a pointer message (P) in the service channel of said frame (Fx) or of a subsequent frame (Fx+n) by the base transceiver station;
  detecting the marked synchronization signal (S') by the mobile unit;
  receiving the pointer message (P) by the mobile unit;
  extracting from the pointer message (P) the position of at least one system message (M') by the mobile unit.

The present invention relates also to a system implementing this method.

12 Claims, 2 Drawing Sheets

METHOD AND SYSTEM TO SYNCHRONIZE MOBILE UNITS TO A BASE TRANSCEIVER STATION

This application is the national phase under 35 U.S.C. § 371 of PCT International Application No. PCT/EP0007120 which has an International filing date of Jul. 24, 2000, which designated the United States of America.

FIELD OF THE INVENTION

The present invention relates to a method to synchronize mobile units to base transceiver stations in digital telecommunication networks, in particular with time division duplex access (TDD), such as for instance mobile telecommunication networks belonging to the UMTS standard (Universal Mobile Telecommunication System), both in the TDD-CDMA version (Time Division Duplex-Code Division Multiple Access) proposed by the 3GPP organization ($3^{rd}$ Generation Partnership Project) and in the TD-SCDMA version (Time Division—Synchronous Code Division Multiple Access) proposed by the CWTS organization (Chinese Wireless Telecommunication Standards). The present invention relates also to a system implementing this method.

It is known that in mobile telecommunication networks with TDD access the transmission and reception of radio signals from and to the base stations, called BS in UMTS environment, do not occur at the same time, but are alternated in a continuous sequence of periods having predefined duration, each one of them, called frame, is conveniently coded and identified by the system. For instance, the UMTS base transceiver stations generally transmit the signals to the mobile units, called UE (User Equipment), in the first half of the frame or semiframe (downlink procedure), and receive in the second half frame the signals transmitted by the user equipment itself (uplink procedure). In particular, each frame lasts 10 ms, subdivided into a plurality of time intervals (timeslots), they too having predefined duration, while the two semi frames can have equal or different duration.

Inside each timeslot the reception/transmission of the useful signal occurs according to the time division access technique called TDMA (Time Division Multiple Access). Moreover, in each timeslot a plurality of signals can be code division multiplexed according to the CDMA access technique (Code Division Multiple Access), so that each radio channel is defined by a particular timeslot and one or more particular access codes.

It is therefore clear that to avoid dangerous interference between the base transceiver stations and user equipments and/or to optimize the communication transfer from a base station to another one, according to a procedure called handover, it is necessary that frames are synchronized among them, in order to be able to separate the transmission and reception periods of user equipment from those of base stations and vice versa. Moreover, it is convenient that also the sequences of digital codes associated to each frame, which are cyclically repeated in time, match during the communications, in order to be able to speed up the above mentioned handover procedure in the user equipment. This last synchronization type is called multiframe synchronisation. An additional synchronization level, called superframe, consists in the numbering of multiframes through sequences which are cyclically repeated in time. Through the hierarchical subdivision of superframes into multiframes and frames, it is therefore possible to define a plurality of service channels whose collocation inside a particular multiframe and/or superframe is known in advance.

To allow the user equipments to synchronize, the base transceiver stations transmit a synchronization signal in a particular channel called SCH (in 3GPP environment) or SYNC (in CWTS environment), which is coded in a different manner from the other channels, superimposing to them in a non-orthogonal mode. In this way the user equipment can easily distinguish the synchronization channel from the remaining channels even in noisy electromagnetic environment.

In particular, the synchronization signal includes a sequence of modulation elementary units, called chips, showing best self-correlation and cross-correlation properties in order to be easily identified by user equipment. This sequence allows to identify the group of codes of the specific base transceiver station, as well as the position in the frame, that is the timeslot and the access codes, of a particular service channel called broadcast or CCPCH (Common Control Physical Channel). This service channel contains the system messages necessary to the user equipment to have access to network services, such as for instance the operator and cell identifiers, the type of services available, the incoming call (paging) and other messages.

However, considering the limited capacity of each radio channel, said system messages shall be often subdivided into several segments or bursts that are transmitted in more time multiplexing consecutive frames. This means that for a correct reconstruction of the message, the user equipment have to assemble the different segments received, re-composing the same in accordance with the transmission order. Since the service channel can transmit different types of system messages, it is necessary to identify the type of each message in order that the user equipment can perform the correct decoding and possibly reject in advance the messages considered not interesting, in this way reducing the use of the available resources and therefore the consumption.

BACKGROUND ART

The identification of the type of system message transmitted by base stations can be made adding a header, which however reduces the neat capacity of the transmission channel, or associating the type of message to the frame number where it is placed, but this requires to unprofitably code in permanent manner the time multiplexing of the messages in the multiframe.

SCOPE AND SUMMARY OF THE INVENTION

Scope of the present invention is therefore that to indicate a method and a synchronization system, free from the above mentioned drawbacks. Said scope is attained with a method and a system whose main characteristics are specified in claims 1 and 7, respectively, while other characteristics are specified in the appended claims.

Thanks to the marking of the synchronization signal and to the transmission of a particular pointer message, both executed by the base transceiver station, the method according to the present invention allows to reduce the power consumption of the user equipment, since it is possible to optimize the listening time of system messages avoiding the examination of the messages considered not interesting by the user equipment.

A further advantage of the method according to the present invention consists in optimizing not only the listening times, but also the transmission capacity of system messages, since it is possible to mark the messages in the service channel without transmitting header which would reduce the transmission capacity.

An additional advantage of the method according to the present invention is represented by the possibility to extend or increase the kinds of system messages without modifying the structure of the physical channels, as well as by the robustness due to the use of the synchronization physical channel to point to a logic channel which in turn points to other logic channels, thus availing of the easy reception of the synchronization channel itself.

According to a particular aspect of the method of the present invention, the marking of the synchronization signal transmitted by a base transceiver station can be used also to synchronize in multiframes other base transceiver stations capable of directly receiving said signal.

According to another particular aspect of the method of the present invention, the marking of the synchronization signal by the base transceiver station includes one or more consecutive polarity inversions of the relevant modulation elementary units. In this way, the best self-correlation and cross-correlation properties of the synchronization signal are not decreased, thus maintaining its easy reception unchanged, particularly in noisy electromagnetic environments.

Moreover, the method according to the present invention can be easily implemented with least modifications to the known telecommunication systems, since the implementation of the relevant operational steps in the base transceiver stations and in user equipment requires only software but not hardware modifications.

BRIEF DESCRIPTION OF THE DRAWINGS

The present invention together with further advantages and characteristics thereof may be understood by those skilled in the art making reference to the following detailed description taken in conjunction with the accompanying drawings in which.

DETAILED DESCRIPTION OF SOME PREFERRED EMBODIMENTS OF THE INVENTION

Figure 1:
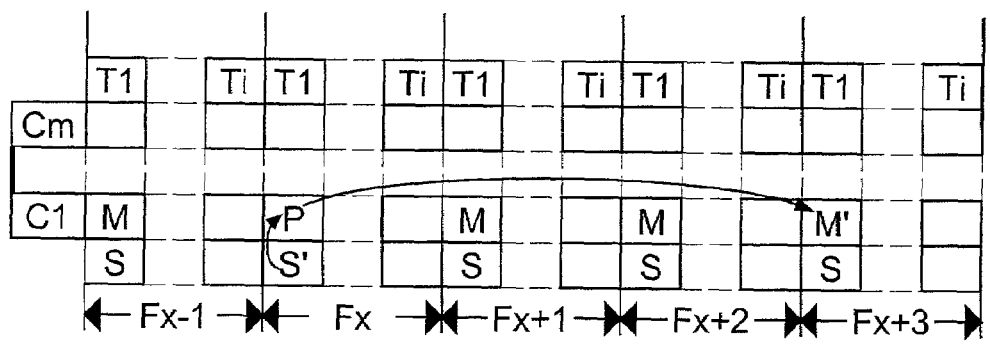
FIG. 1 shows a partial diagram of the structure of radio channels in a first embodiment of the method according to the present invention.
Figure 3:
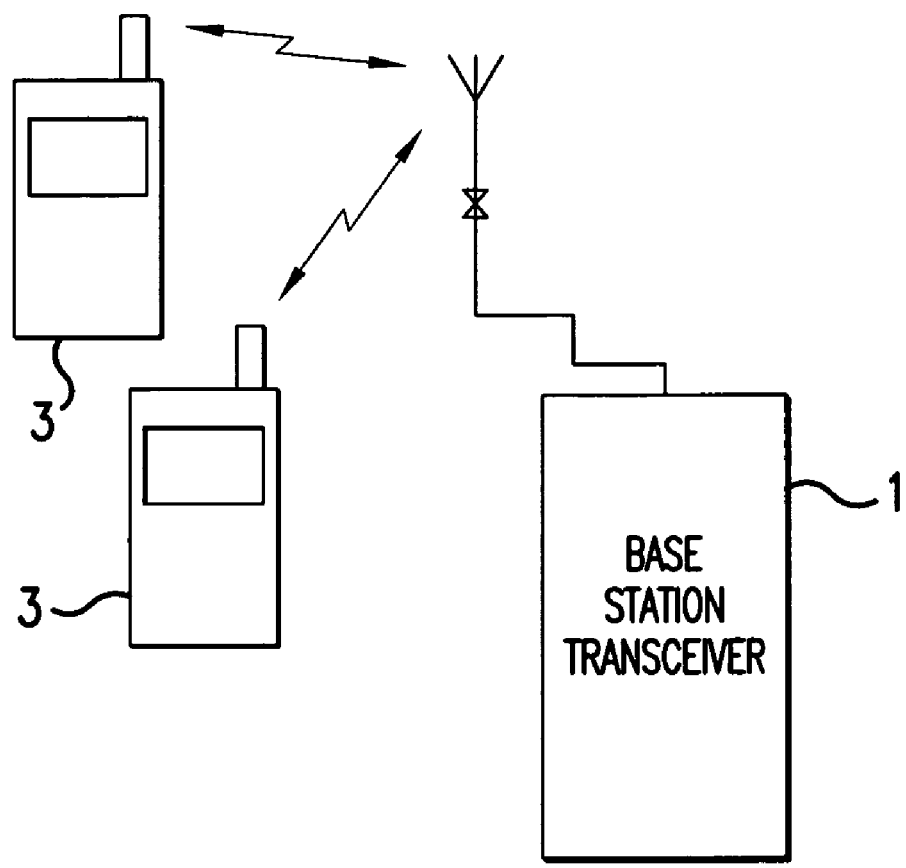
FIG. 3 shows an arrangement of a base station and user equipment for telecommunications.

With reference to FIGS. 1 and 3, we can notice that in a first embodiment of the method according to the present invention at least one base station 1 transmits the radio signals that can be received by one or more user equipment 3 in the known manner, and vice versa. Said signals are subdivided into a plurality of frames Fn, for instance Fx−1, Fx, Fx+1, Fx+2, Fx+3, in their turn subdivided into a plurality of timeslots Tn, for instance from T1 to Ti, and into a plurality of access codes Cn, for instance from C1 to Cm. Furthermore, the base transceiver stations transmit a synchronization signal S in a coded channel in a manner different from the other channels, for instance phase modulating the radio carrier according to the BPSK technique (Binary Phase Shift Keying).

This synchronization signal S includes in the known way a sequence of modulation elementary units, enabling to identify the group of codes of the specific base transceiver station, as well as the timeslot and access codes, for instance the timeslot T1 and code C1 of the service channel containing the system messages M necessary to the user equipment to have access to network services. To obtain the content of messages M, often subdivided into segments transmitted in more consecutive frames, the user equipment receive and decode the signal S.

In the first embodiment of the method according to the present invention, the base station conveniently modifies the sequence of modulation elementary units of the synchronization signal S in a frame Fn, for instance in the frame Fx, to the purpose of signaling to user equipment the presence of a particular pointer message P in the service channel of the same frame or of a subsequent frame whose position is known in advance.

The pointer message P, which preferably occupies one sole frame to speed up the acquisition time, contains in its turn the frame synchronisms of higher hierarchical order, that is the information relevant to the multiframe and possibly to the superframe. This information enables to know when the first segment of a new system message starts and therefore determine the position, for instance in the frame Fx+3, of a particular system message M', which in its turn can be subdivided into more consecutive frames. The user equipments, on reception of the synchronization signal S' marked by the modified sequence of modulation elementary units, decode the pointer message P and possibly examine, whether interesting, the system message M' pointed by the pointer message P.

In particular, in the present embodiment the marking of the sequence of modulation elementary units is obtained modulating the sequence of signal S with logic coefficient −1, that is, inverting its polarity. The detection of polarity of the sequence marked S' in the synchronization channel can coherently occur, averaging the polarities of more subsequent frames to reduce possible errors, or incoherently, making a difference between the polarities of two subsequent frames.

Figure 2:
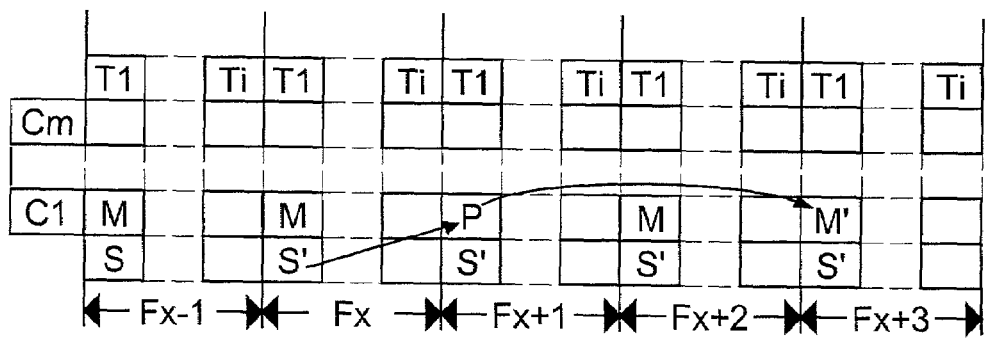
FIG. 2 shows a partial diagram of the structure of radio channels in a second embodiment of the method according to the present invention.

With reference to FIG. 2, we see that a second embodiment of the method according to the present invention differs from the first embodiment in that the synchronization signal marked S' indicates to the user equipments the presence of the pointer message P in the service channel of a frame Fx+n following the one where the signal marked S' is present (in the example n=1). In the following frame Fx+n+1, this signal, instead of returning to the original state S, for instance at non inverted polarity, remains in the modified state S' until it is necessary to indicate the presence of another pointer message P. Therefore, in the present embodiment, the presence of pointer messages P is indicated by the base station to the user equipments through a transition of the status of the synchronization signal. In the figures, arrows indicate the pointing from signals marked S' to pointer messages P, as well as from pointer messages P to the first segment of the new system messages M'.

In another embodiment of the method according to the present invention the marking of the synchronization signal S by the base transceiver station occurs with multiple periodicity versus its own multiframe period. In this way, the marking of the synchronization signal transmitted by a base transceiver station can be used also to synchronize in multiframe other base transceiver stations capable of directly receiving said signal.

The method according to the present invention can also be applied to the particular mechanism of system messages transmission on the service channel, which has been proposed in the 3GPP. In said field, system messages are sent in blocks that can have each, different characteristics, such as for instance the repetition speed. Among said block, a master block is defined, listing and describing all the blocks currently in use in the base station, and gives also a method to determine when any information is updated. The marking of the synchronization signal S and the transmission of the pointer message P could, in this case, enable the user equipments to quickly identify the master block and consequently perform an effective acquisition of all the necessary system information.

Therefore, while an embodiments of the present invention has been shown and described, it should be understood that other embodiments and/or additions thereto, in particular in the marking algorithm of the synchronization signal S, can be made by those skilled in the art without departing from the scope thereof.

The invention claimed is:

1. A method to synchronize at least a user equipment to at least one base transceiver station belonging to a digital telecommunication network, in which radio signals transmitted and received by said base transceiver station are subdivided into frames (Fn) having predefined duration and each frame is subdivided into a predefined number of timeslots (Tn) and codes (Cn), said signals including at least a synchronization signal (S), which is transmitted by the base transceiver station and contains a modulation elementary units sequence suitable to identify the timeslot (T1) and the code (C1) of a service channel containing a system messages (M), the method comprising:
  marking the synchronization signal (S), in at least one frame (Fx), by the base transceiver station;
  transmitting a pointer message (P) in the service channel of such frame (Fx), or of a subsequent frame (Fx+n), by the base transceiver station;
  detecting the marked synchronization signal (S') by the user equipment;
  receiving the pointer message (P) by the user equipment;
  extracting from the pointer message (P) the position of at least a system message (M') by user equipment, wherein
  the base transceiver station marks the synchronization signal to indicate to the user equipment the presence of a pointer message.

2. A method to synchronize at least a user equipment to at least one base transceiver station belonging to a digital telecommunication network, in which radio signals transmitted and received by said base transceiver station are subdivided into frames (Fn) having predefined duration and each frame is subdivided into a predefined number of timeslots (Tn) and codes (Cn), said signals including at least a synchronization signal (S), which is transmitted by the base transceiver station and contains a modulation elementary units sequence suitable to identify the timeslot (T1) and the code (C1) of a service channel containing a system messages (M), the method comprising:
  marking the synchronization signal (S), in at least one frame (Fx), by the base transceiver station;
  transmitting a pointer message (P) in the service channel of such frame (Fx), or of a subsequent frame (Fx+n), by the base transceiver station;
  detecting the marked synchronization signal (S') by the user equipment;
  receiving the pointer message (P) by the user equipment;
  extracting from the pointer message (P) the position of at least a system message (M') by user equipment, wherein
  the marking of the synchronization signal (S) by the base transceiver station includes at least a polarity inversion of the relative modulation elementary units.

3. The method according to claim 2, wherein the marking of the synchronization signal (S) by the base transceiver station includes two polarity inversions of the relative modulation elementary units in two consecutive frames (Fx, Fx+1).

4. The method according to any of claims 1 to 3, wherein the extraction from the pointer message (P) of the position of at least a system message (M') includes the decoding of the frame number of such system message (M').

5. The method according to claim 4, wherein the extraction from the pointer message (P) of the position of at least a system message (M') includes the decoding of the multiframe number of such system message (M').

6. The method according to any of claims 1 to 3, wherein the marking of the synchronization signal (S) by the base transceiver station takes place with periodicity multiple of its own multiframe period.

7. A system to synchronize at lease one user equipment to at least one base transceiver station belonging to a digital telecommunication network, in which radio signals transmitted and received from said base transceiver station are divided into frames (Fn) having predefined duration and each frame is subdivided in a predefined number of timeslots (Tn) and codes (Cn), said signals including at least a synchronization signal (S) which is transmitted by the base transceiver station and includes a sequence of modulation elementary units suitable to identify the timeslot (T1) and the code (C1) of a service channel containing system messages (M), the system comprising:
  at least a base transceiver station with means adapted to mark the synchronization signal (S) in at least one frame (Fx), and to transmit a pointer message (P) in the service channel of this frame (Fx) or of a subsequent frame (Fx+n), said base transceiver station marking the synchronization signal to indicate to the user equipment the presence of a pointer message.

8. The system according to claim 7, wherein the system includes at least a user equipment with means adapted to detect the marked synchronization signal (S') from said base transceiver stations to receive the pointer message (P) transmitted by said base transceiver station, and to extract from the pointer message (P) the position of at least a system message (M').

9. The system according to claim 7 or 8, wherein the system includes an additional base transceiver station adapted to detect the marked synchronization signal (S'), and synchronize in multiframe with said first base transceiver station through such marked synchronization signal (S').

10. The system according to claim 7, wherein the system is adapted to implement the method according to claim 1.

11. A base transceiver station for a digital telecommunication network in which radio signals transmitted from the base transceiver station are divided into frames (Fn) having predefined duration and each frame is subdivided in a predefined number of timeslots (Tn) and codes (Cn), said signals including at least a synchronization signal (S) which is transmitted by the base transceiver station and includes a sequence of modulation elementary units suitable to identify the timeslot (T1) and the code (C1) of a service channel containing system messages (M), the base transceiver station comprising:

means for generating a marked synchronization signal (S) in at least one frame (Fx) indicating the presence of a pointer message (P) to user equipment adapted to receive the transmitted radio signals, and means for transmitting the pointer message (P) in the service channel of this frame (Fx) or of a subsequent frame (Fx+n).

12. The base station according to claim 11, wherein the marked synchronization signal (S) includes at least a polarity inversion of the relative modulation elementary units.

* * * * *